(12) United States Patent
Gattavari

(10) Patent No.: US 10,100,947 B2
(45) Date of Patent: Oct. 16, 2018

(54) SHUTTER FOR A ROTARY ADJUSTMENT VALVE

(71) Applicant: VALPRES S.R.L., Marcheno (Brescia) (IT)

(72) Inventor: Claudio Angelo Gattavari, Bagnacavallo (IT)

(73) Assignee: VALPRES S.R.L., Marcheno (IT)

( * ) Notice: Subject to any disclaimer, the term of this patent is extended or adjusted under 35 U.S.C. 154(b) by 0 days.

(21) Appl. No.: 15/105,313

(22) PCT Filed: Dec. 17, 2014

(86) PCT No.: PCT/IB2014/067006
§ 371 (c)(1),
(2) Date: Jun. 16, 2016

(87) PCT Pub. No.: WO2015/118392
PCT Pub. Date: Aug. 13, 2015

(65) Prior Publication Data
US 2016/0341334 A1    Nov. 24, 2016

(30) Foreign Application Priority Data

Feb. 7, 2014    (IT) .............................. MO2014A0022

(51) Int. Cl.
| F16K 47/04 | (2006.01) |
| F16K 1/54 | (2006.01) |
| F16K 3/08 | (2006.01) |
| F16K 5/06 | (2006.01) |

(52) U.S. Cl.
CPC .......... *F16K 47/045* (2013.01); *F16K 5/0605* (2013.01); *F16K 1/54* (2013.01); *F16K 3/085* (2013.01); *F16K 5/06* (2013.01); *F16K 47/04* (2013.01)

(58) Field of Classification Search
CPC ........ F16K 47/045; F16K 47/04; F16K 3/085; F16K 5/06; F16K 5/0605; F16K 1/54
See application file for complete search history.

(56) References Cited

U.S. PATENT DOCUMENTS

| 3,665,965 | A | * | 5/1972 | Baumann | ................ | F16L 55/04 |
| | | | | | | 138/42 |
| 4,479,510 | A | * | 10/1984 | Bey | ......................... | F16K 5/10 |
| | | | | | | 137/625.31 |
| 4,530,375 | A | | 7/1985 | Bey | | |
| 4,610,273 | A | | 9/1986 | Bey | | |
| 5,070,909 | A | * | 12/1991 | Davenport | ............ | F16K 5/0605 |
| | | | | | | 137/625.32 |
| 5,180,139 | A | * | 1/1993 | Gethmann | ............ | F16K 5/0605 |
| | | | | | | 137/625.32 |

(Continued)

FOREIGN PATENT DOCUMENTS

| EP | 0 013 601 B1 | 1/1983 |
| EP | 0 621 428 A1 | 10/1994 |

*Primary Examiner* — Matthew W Jellett
*Assistant Examiner* — Christopher Ballman
(74) *Attorney, Agent, or Firm* — Pearne & Gordon LLP

(57) ABSTRACT

A shutter for a rotary valve, comprising: a main body (2), having a substantially spheroidal conformation or suitable for rotating about an axis and equipped with a through cavity (3); at least one plate (4), provided with a plurality of through holes (5) and arranged inside the through cavity (3). The plate (4) has a curved conformation.

14 Claims, 3 Drawing Sheets

(56) References Cited

U.S. PATENT DOCUMENTS

| | | | |
|---|---|---|---|
| 5,332,004 A | | 7/1994 | Gethmann et al. |
| 5,400,825 A | | 3/1995 | Gethmann et al. |
| 5,680,889 A | * | 10/1997 | Boger .................. F16K 5/12 137/625.32 |
| 6,520,209 B1 | * | 2/2003 | Lundqvist ............ F16K 5/0605 137/625.31 |
| 7,011,109 B2 | | 3/2006 | Tran et al. |
| 2003/0192605 A1 | | 10/2003 | Tran et al. |
| 2010/0163774 A1 | | 7/2010 | Rimboym et al. |
| 2012/0145939 A1 | | 6/2012 | Rimboym et al. |

* cited by examiner

SHUTTER FOR A ROTARY ADJUSTMENT VALVE

The object of the present invention is a shutter for a rotary valve, and a valve comprising this shutter.

The current state of the art in the field of rotary adjustment valves comprises valves known as "Q-Trim" valves. Such valves comprise the presence of one or more perforated plates; normally there is a maximum of seven plates inside the cavity of the spherical shutter or the like.

These plates each have a number of openings which can be realized in the form of holes or slits. The purpose of these plates is to divide in various stages the rise in pressure that the fluid, be it liquid or gaseous, undergoes as it passes inside the shutter. The greater the number of plates, the greater the number of stages in which the rise in pressure will be divided, thereby leading to benefits in terms of noise level for valves that treat compressible fluids, and in terms of treatment of cavitation for valves that treat incompressible fluids. The plates can have various geometries customized according to the manufacturer.

The number of holes or slits present in each plate determines the plate's resistance to the fluid and the number of holes or slits is calculated based on process conditions.

Usually, the greater the number of holes, the smaller the diameter of the jet of liquid that flows through an individual hole, lessening also the effect of possible cavitation.

Considering a gaseous fluid, the greater number of holes, the higher the peak frequency of the valve, and the greater the attenuation of the aerodynamic noise level.

These valves are generally based on the following principles: division of the rise in pressure into a number of steps, velocity control inside the trim or shutter, division of the confined flow into a number of paths, and increase in peak frequency.

The plates present inside the adjustment member substantially define the trim or shutter of these adjustment valves. The most valuable feature of these valves relates to the fact that the plates are integral with the ball (shutter) and rotate with it. In this manner, they offer greater resistance at low flow rates, at which a greater head is usually required, and minimum resistance when the valve is open, that is, at higher flow rates, at which the process requires low pressure loss.

In the event that very severe process conditions arise, usually with very high rises in pressure, the solution presented as yet can be limiting in terms of performance relating to noise level or the attenuation of cavitation. The main problem is the physical limit in the number of plates that can be installed inside a ball, owing to design issues and in order not to sacrifice too much of its maximum capacity (Cv/Kv), which constitutes the true strong point of these valves. Additional devices are often installed on the valve; they are often economical, but they do not always solve the problem.

In many cases, more sophisticated valves need to be adopted. Such valves usually succeed in providing better control of the velocities within the trim, limiting the kinetic energy values that can be reached by the fluid. In this manner, the flow is kept further away from the cavitation limits, for liquids, and the aerodynamic noise due to acceleration of the confined flow is limited, for gases. One example of valves of this type is known from U.S. Pat. No. 7,011,109.

The principal limit of these solutions lies in the maximum capacity of the valve. The passage is totally or partially obstructed based on the degree of aperture needed to satisfy the process conditions. In any case, even when fully opened, the front cavity of the ball will be such as to markedly reduce the capacity (Cv or Kv) thereof.

By way of example, a valve with DN-100 plates can have a maximum Cv on the order of 500, whereas the Cv of a globe valve, having the same nominal diameter, can reach a maximum Cv of 160-200.

The more sophisticated types of ball valves usually reach comparable or slightly higher Cv values compared to globe valves.

An aim of the present invention is to offer a shutter or trim for a rotary valve that makes it possible to improve the characteristics of the shutters that are currently available.

An advantage of the shutter according to the present invention is that it maintains a high flow coefficient of the valve, substantially equal to the coefficient of flow of currently available valves.

Another advantage of the shutter according to the present invention is that it does not require structural modification of the currently available valves.

Another advantage of the shutter according to the present invention is that it enables an increase in the peak frequency of the valve in which is installed.

Another advantage of the shutter according to the present invention is that it markedly reduces the impacting sound waves produced by the fluid in transit.

A further advantage of the shutter according to the present invention is that of obtaining a much higher recovery factor FL for the valve in which is installed, compared to shutters of the prior art.

Further characteristics and advantages of the present invention will become more apparent in the following detailed description of an embodiment of the invention at hand, illustrated by way of non-limiting example in the attached figures, of which:

Figure 1:
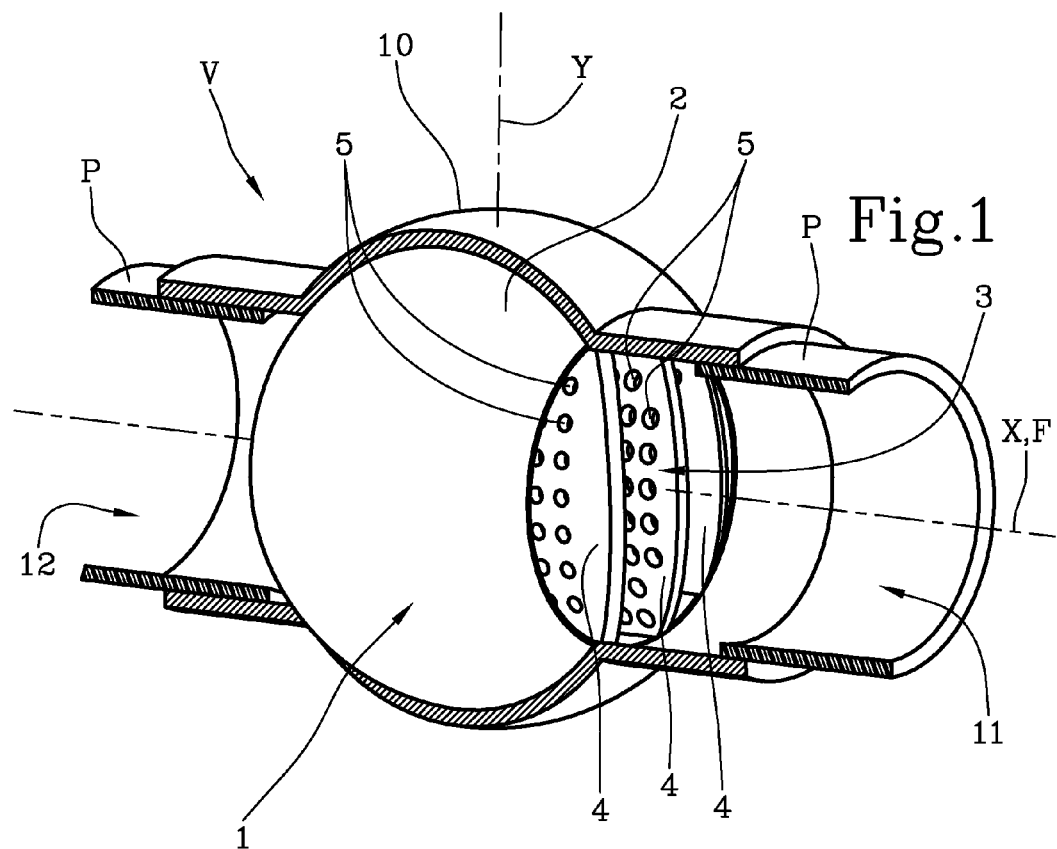
FIG. 1 is a schematic view of the shutter according to the present invention, in an open configuration.

The shutter (1) for a rotary valve according to the present invention comprises a main body (2), having a substantially spheroidal conformation or, in general, shaped so as to rotate about an axis. The main body (2) is equipped with a through cavity (3). This through cavity (3) is substantially in the form of a hole having a longitudinal axis (X) and afforded through the main body (2). During use, the flow of the fluid to be treated passes through the through cavity (3). During use, the main body (2) can rotate with respect to the body (10) of a valve (V) about an axis of rotation (Y), arranged perpendicular to the longitudinal axis (X). The body (10) of the valve (V) has a first opening (11) and a second opening (12) designed to be connected to two tracts of a line (P). Preferably, but not necessarily, the first and the second opening (11, 12) are aligned with each other along a longitudinal axis (F) of the line (P) along which the valve (V) is mounted.

The shutter (1) can rotate between at least one opening position, in which the through cavity (3) puts the first and the second opening (11, 12) in communication, and a closed position, in which the through cavity (3) is not in communication with the first and the second opening (11, 12).

Figure 3:
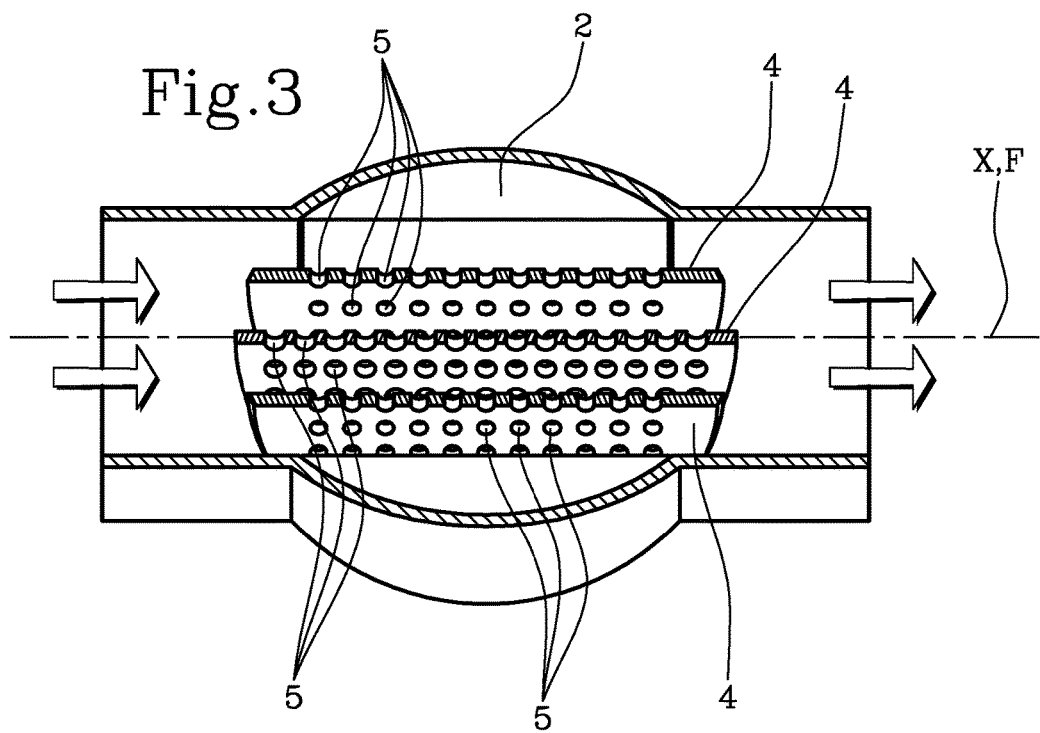
FIG. 3 is a section view of the shutter according to the present invention, in an open configuration.
Figure 4:
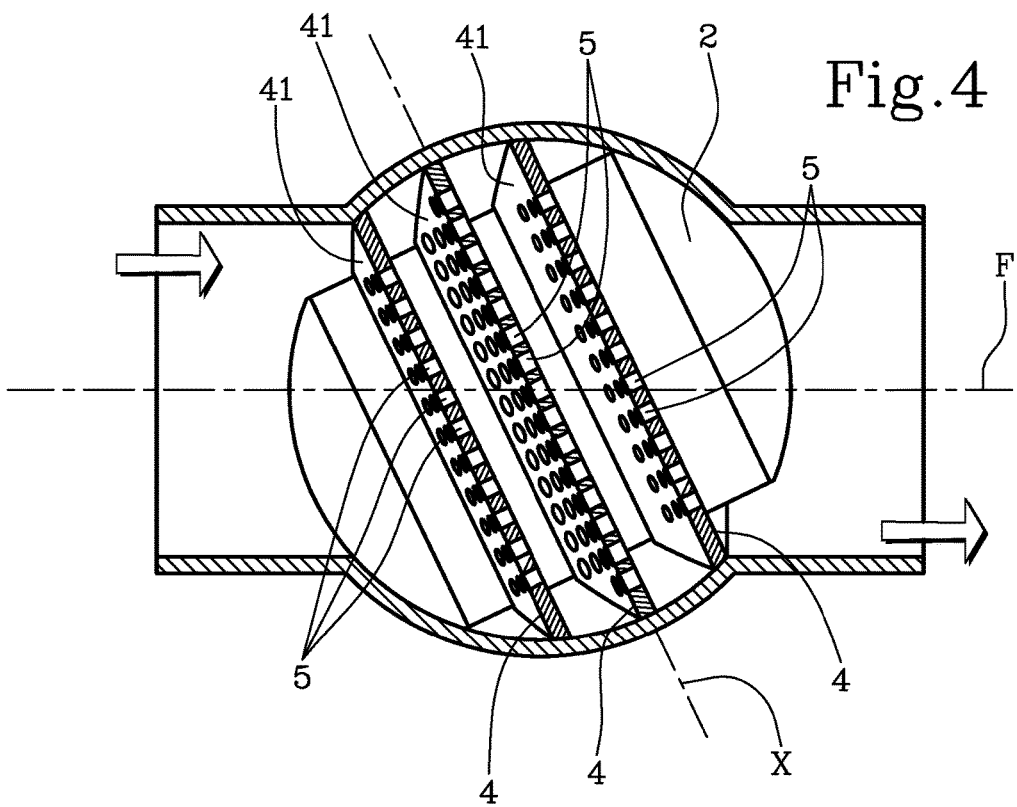
FIG. 4 shows the shutter of FIG. 3 in a partially open configuration.

In the preferred embodiment of the valve, the main body (2) can rotate between at least one completely open position, as shown in FIG. 3, in which the longitudinal axis (X) is aligned with the longitudinal axis (F) of the line (P) along which the valve (V) comprising the shutter (1) is mounted, and a closed position, as shown in FIG. 4, in which the through cavity (3) does not face the line (P) along which the valve (V) is mounted. In the closed position, the fluid is substantially intercepted by main body (2) and it cannot pass through the shutter (1), in that the through cavity (3) is not in communication with the line.

The shutter further comprises at least one plate (4), provided with a plurality of through openings (5) and arranged within the through cavity (3). The plate (4) is integral with the main body (2) of the shutter (1). The plate (4) is oriented parallel to the longitudinal axis (X) and to the axis of rotation (Y). In this manner, in the open position of the main body (2), the plate (4) is arranged parallel to the longitudinal axis (F) of the line (P), which also defines the direction of flow, offering the minimum cross-sectional area as an obstacle to the flow. In the intermediate positions between the open position and the closed position, the plate (4) tilts with respect to the direction of flow (F), offering an obstructing cross-sectional area that gradually increases passing from the open position to the closed position, as can be seen in FIGS. 3 and 4. In the intermediate positions between the open position and the closed position, the fluid is forced, at least in part, to pass through the through openings (5), dissipating part of its energy.

Figure 2:
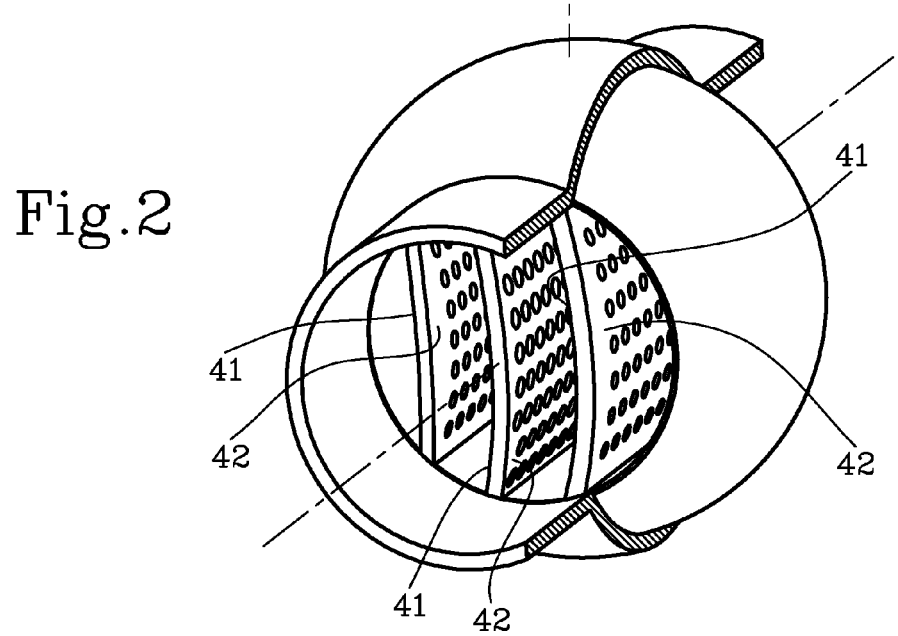
FIG. 2 shows the shutter of FIG. 1, from a different viewpoint.

Advantageously, the plate (4) has a curved conformation. The plate (4) is preferably curved about an axis parallel to the longitudinal axis (X), as can be seen in FIGS. 1 and 2. In this manner, the plate (4) substantially defines a portion of a tubular cylindrical element, of a thickness and angular extension that are pre-established based on the process conditions, and having a concave face (41) and a convex face (42) that are concentric to each other.

In the preferred embodiment, the plate (4) has a constant radius of curvature on any section plane perpendicular to the longitudinal axis (X). In particular, both the concave face (41) and the convex face (42) have constant radii of curvature on any section plane perpendicular to the longitudinal axis (X). This does not exclude that the radius of curvature of the plate (4) may be variable, in relation to different process conditions.

In a particularly effective embodiment, the mean radius of curvature of the plate (4), measured approximately on an intermediate section between the concave face and the convex face, is substantially equal to diameter of the through cavity (3).

In the case of treatment of a liquid, the plate (4) shall be arranged in such a manner that in the intermediate positions between the open position and the closed position, the concavity shall face the opposite side with respect to the direction of flow. This means that the jets in which the flow is divided, converge with each other as they pass through the through openings (5). In this manner, the adjacent jets of fluid interfere with each other, introducing an additional loss of head. Moreover, they tend to confine any cavitation to a delimited zone, limiting wear of the valve plates. Vice versa, in the case of treatment of a vapour or gas, the plate (4) shall be arranged in such a manner that in the intermediate positions between the open position and the closed position, the concavity shall face the same side, with respect to the direction of flow. This means that the jets in which the flow is divided, diverge from each other as they pass through the through openings (5). This configuration allows the jets of fluid exiting the plate to diverge from each other, limiting their interaction and thus reducing the level of noise emitted by the valve.

The shutter can be provided with one or more plates (4) of the type described, arranged one parallel to the other and with the concavity facing the same side. In the embodiment shown in the figures, the shutter is provided with three plates (4). The presence of a higher number of plates makes it possible to increase the variation of overall pressure caused by passage through the shutter.

The curved conformation of the plate (4) or plates (4) offers significant advantages. As mentioned above, it makes it possible to obtain a recovery factor FL that is markedly higher than that of conventional shutters, for the treatment of non-compressible fluids and for the treatment of compressible fluids. In the treatment of non-compressible fluids, a high recovery factor FL determines greater resistance to the cavitation phenomenon and to choked flow, owing to lower pressure recovery. Furthermore, the incipient cavitation coefficient is higher compared to that of currently available valves. In the case of treatment of compressible fluids, a higher recovery factor FL leads to a decrease in noise emission.

The curved plates also offer a greater surface area compared to the flat plates of conventional shutters, making it possible to realize an optimal distribution of the openings (5) and to increase the peak frequency of the valve.

Moreover, the curved conformation of the plate or plates (4) does not decrease capacity (Cv/Kv) with the valve fully opened.

The through openings (5) can be provided with a constant or variable cross-sectional area.

In general, if the fluid to be treated is compressible (i.e., a gas or vapour), it can be advantageous that the path defined by the openings (5) increase in cross section in the direction of flow, so as to compensate for the increase in the specific volume of the fluid, that is, the decrease in the density of the fluid determined by the drop in pressure. The increase in the cross section of the path defined by the openings (5) can be obtained for example by increasing the cross section of the openings themselves in the direction of flow, and/or by increasing the number of openings (5) between one plate and the other in the direction of flow, in solutions having a number of plates (4).

If the fluid to be treated is a liquid, gradually reducing the cross section and/or the number of openings (5) from one plate to the other in the direction of flow can prove to be advantageous in facilitating the dissipation of energy of the fluid.

Figure 5:
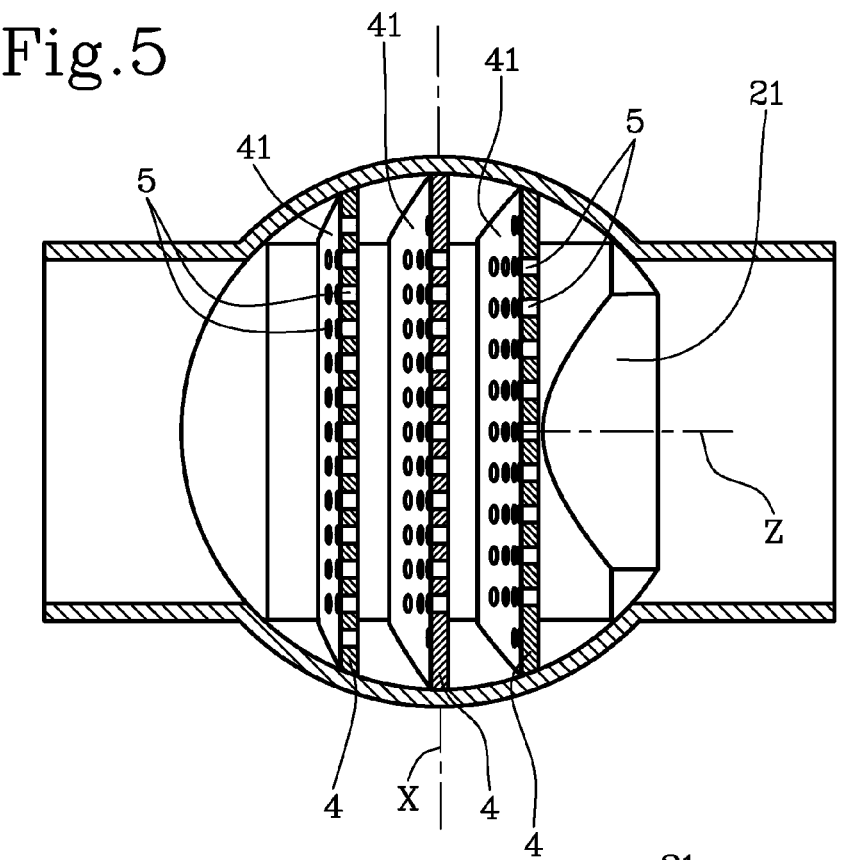
FIG. 5 shows an alternative embodiment of the shutter according to the present invention, in a closed configuration.
Figure 6:
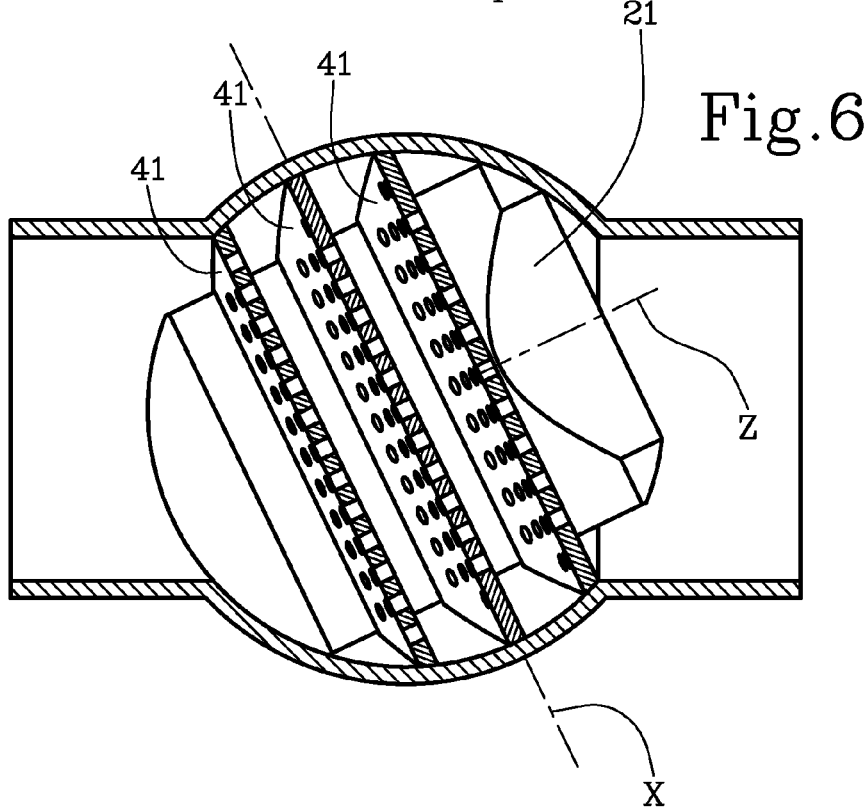
FIG. 6 shows the shutter of FIG. 5 in a partially open configuration.

The main body (2) of the shutter (1) can be provided with a lateral opening (21) that opens into the through cavity (3), as shown in FIGS. 5 and 6. This lateral opening (21) has a longitudinal axis (Z) perpendicular to the longitudinal axis (X) of the through cavity (3) and to the axis of rotation (Y) of the main body (2). As can be seen in FIG. 7, in an intermediate opening position of the shutter (1), the lateral opening (21) faces the outflow line (P) from the valve (V). The lateral opening (21) is advantageous in the case of gaseous fluids, in that with limited openings of the shutter, the fluid increases its specific volume and it therefore requires a passage area for outflow from the ball that is larger than the inflow area.

The invention claimed is:

1. A method of treating a liquid, comprising passing a liquid through a shutter in a first direction of flow, wherein the shutter comprises:
   a main body (2), having a substantially spheroidal conformation and equipped with a through cavity (3) having a longitudinal axis (X);
   at least one plate (4), equipped with a plurality of through openings (5) and arranged within the through cavity (3), extending from an inlet of the through cavity to an outlet of the through cavity;
   wherein the at least one plate (4) comprises a concave face (41) and a convex face (42) being concentric to one another;
   wherein the at least one plate (4) is curved about an axis that is parallel to the longitudinal axis (X);
   wherein the concave face of the at least one plate (4) faces an opposite direction to the first direction of flow when the shutter is at least partially open.

2. The method of claim 1, wherein the plate (4) has a constant radius of curvature on any section plane perpendicular to the longitudinal axis (X).

3. The method of claim 1, wherein both the concave face (41) and the convex face (42) have constant radii of curvature on any section plane perpendicular to the longitudinal axis (X).

4. The method of claim 3, wherein the mean radius of curvature of the plate (4), measured approximately on an intermediate section between the concave face and the convex face, is substantially equal to the diameter of the through cavity (3).

5. The method of claim 1, wherein the main body (2) is provided with a lateral opening (21) that opens into the through cavity (3) and has a longitudinal axis (Z) perpendicular to the longitudinal axis (X) of the through cavity (3) and to the axis of rotation (Y) of the main body (2).

6. The method of claim 1, comprising one or more plates (4) arranged one parallel to the other and with the concavity facing the same side.

7. The method of claim 1, wherein the through openings (5) are provided with a variable cross-sectional area.

8. A method of treating a gas, comprising passing a gas through a shutter in a first direction of flow, wherein the shutter comprises:
   a main body (2), having a substantially spheroidal conformation and equipped with a through cavity (3) having a longitudinal axis (X);
   at least one plate (4), equipped with a plurality of through openings (5) and arranged within the through cavity (3), extending from an inlet of the through cavity to an outlet of the through cavity;
   wherein the at least one plate (4) comprises a concave face (41) and a convex face (42) being concentric to one another;
   wherein the at least one plate (4) is curved about an axis that is parallel to the longitudinal axis (X);
   wherein the concave face of the at least one plate (4) faces in the first direction of flow when the shutter is at least partially open.

9. The method of claim 8, wherein the plate (4) has a constant radius of curvature on any section plane perpendicular to the longitudinal axis (X).

10. The method of claim 8, wherein both the concave face (41) and the convex face (42) have constant radii of curvature on any section plane perpendicular to the longitudinal axis (X).

11. The method of claim 10, wherein the mean radius of curvature of the plate (4), measured approximately on an intermediate section between the concave face and the convex face, is substantially equal to the diameter of the through cavity (3).

12. The method of claim 8, wherein the main body (2) is provided with a lateral opening (21) that opens into the through cavity (3) and has a longitudinal axis (Z) perpendicular to the longitudinal axis (X) of the through cavity (3) and to the axis of rotation (Y) of the main body (2).

13. The method of claim 8, comprising one or more plates (4) arranged one parallel to the other and with the concavity facing the same side.

14. The method of claim 8, wherein the through openings (5) are provided with a variable cross-sectional area.

* * * * *